July 14, 1964  D. SHELDON  3,140,818
COMBINED IDENTIFICATION AND ADDRESS PLATE
Filed July 10, 1961
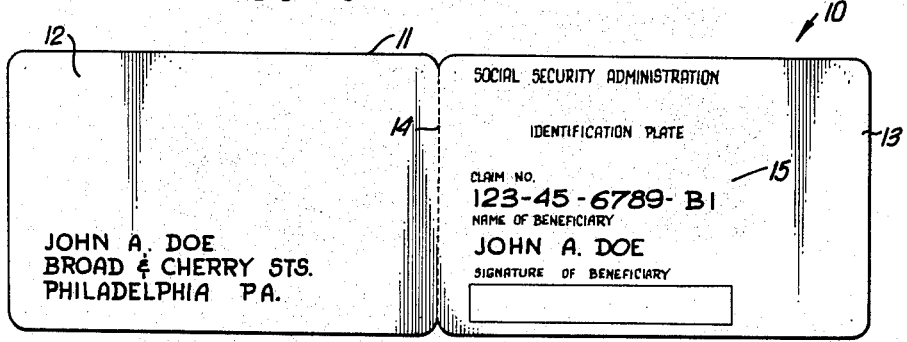
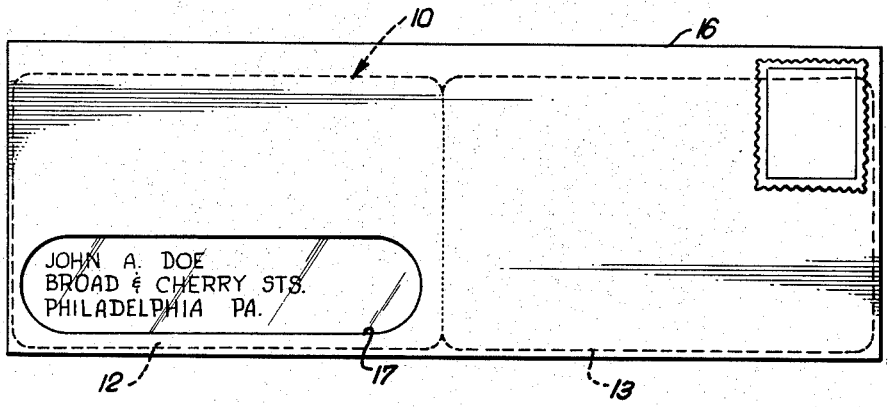
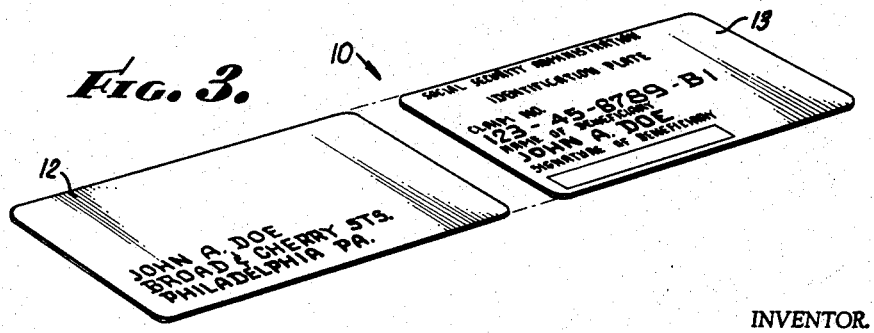
INVENTOR.
DUNSTAN SHELDON
BY
ATTORNEYS.

United States Patent Office 3,140,818
Patented July 14, 1964

3,140,818
COMBINED IDENTIFICATION AND ADDRESS PLATE
Dunstan Sheldon, Berwyn, Pa., assignor to Dashew Business Machines, Inc., Culver City, Calif., a corporation of Delaware
Filed July 10, 1961, Ser. No. 122,863
1 Claim. (Cl. 229—92.8)

This invention relates to a composite information bearing card means or identification means for facilitating mailing of said card means to owners thereof. The invention also relates to a means and method of eliminating collation of such card means for mailing.

Credit cards, identification plates, and other identification means carried on one's person for identification and credit purposes are produced in quantities in the order of hundreds of thousands and millions. They are often periodically reproduced for substitution of earlier issued cards. Such prior proposed credit cards have included relatively stiff plates of a size adapted to be carried in a wallet or pocketbook and provided with embossed, printed, stamped, coded and other forms of intelligence or data symbols. Heretofore such prior proposed card means included the legible address and account number of the owner of the card.

It has been found desirable to eliminate the address of the owner of the card for various reasons. One of the principal reasons for deleting the address from a credit card is that a high percentage (20% or more has been indicated) of address changes occur during the period of preparation and mailing of credit cards. Thus reissue and remailing of the card is required. Moreover, a credit card bearing a wrong address is subject to questioning and detracts from positive identification. When such wrong address is relied upon for mailing purposes, an invoice, article or other item will be obviously misdirected.

Credit cards prepared without the address and with only name and account number have been heretofore manually compared or collated with a separate mailing address on an envelope or with a mailing piece which may comprise an IBM tab card addressed by machine and having die cuts for holding an associated credit card. In such instance the name and account number must be compared, the credit card manually associated with the mailing piece, and the mailing piece manually inserted into an envelope. Any change in sequence or order of mailing pieces and credit cards will produce errors and will increase costs of processing such cards. Since prior proposed cards are now required with only the name and account number thereon a time consuming, difficult and tedious comparing step has been introduced in the processing of such credit cards in order to accurately collate the credit card with the mailing address of the owner appearing on an envelope or a mailing piece for window envelope.

The present invention contemplates a credit card means which eliminates the step of costly manual matching or comparing of cards and addresses and the step of associating a card with a mailing piece. The present invention eliminates preparation of a mailing piece and substantially reduces the overall time required for mailing and preparing for mailing such credit cards. It obviates the disadvantages mentioned above and assures accurate error-free mailing of credit cards to known addresses. In addition, since production time is substantially reduced, address changes, which heretofore occurred after processing for mailing commenced, were avoided and cards were not returned because of a change in last known addresses.

The present invention contemplates a composite information bearing card means wherein one card or plate portion is provided with a selected set of information including, for example, the name and address, while another spaced portion of the card means is provided with another set of information including name and account number. The card portions may be prepared in the same operation, as by information fed through data processing means to an embossing, stamping, or printing machine, and are releasably connected together so that the card portion bearing the name and address may be separated from the other card portion and destroyed, discarded, or may be used as a luggage tag. The set of information including the name and address is used to provide the address for mailing purposes and the composite card may be readily inserted by hand or by machine within an envelope having a transparent window for viewing said address.

The primary object of this invention therefore is to provide as an article of manufacture a composite information bearing credit card means, identification plate, or the like, for use in error-free mailing to the owner thereof.

An object of the present invention is to describe and provide a method of handling and mailing information bearing card means without collation of the information on the card means with a mailing address.

Another object of the invention is to provide a composite card means having multiple uses including error-free mailing, a luggage tag, constant advertising and promotion inuring to the benefit of the issuer of the card means, inventory level control, other retail, commercial and industrial uses, and is particularly adapted for use by oil companies, retail stores, and governmental agencies which require identification means for certain of their activities.

A further object of the invention is to facilitate mailing of two or more card means to the same address.

A still further object is to provide an inventory control card embodying similar features as the credit card means and constructed in similar manner.

Numerous other advantages and objects of the invention will become readily apparent to those skilled in the art from the following description of the drawings in which an exemplary embodiment of the invention is shown.

In the drawings:

FIG. 1 is a plan view of a card means embodying the invention.

FIG. 2 is a plan view showing the card of FIG. 1 in an envelope for mailing.

FIG. 3 is an exploded view of the card means shown in FIG. 1 with the portions thereof in separate relation.

An exemplary credit card means generally indicated at 10 embodying this invention may comprise an elongated rectangular card body member 11 of suitable stock material. The card 10 may be made of metal, metal compositions, plastic compositions or any other suitable material adapted to be embossed, to receive printed or stamped data symbols, to be perforated if desired, or to be deformed so as to permanently carry thereon selected data symbols. Preferably the credit card means 10 is made of substantially semi-rigid material and may be provided with surface coatings adapted to resist soiling and marring of the surface thereof.

The card body member 11 in this example is divided into two card portions 12 and 13, each of the same dimensional size. The card portions 12 and 13 are adapted to be embossed and since they are dimensionally identical they may be oriented in an embossing machine so that information fed to the embossing machine may be duplicated on the card portions or a part of the information thereof may be omitted by suitably modifying the programming of the embossing machine. In this example card portions 12 and 13 are each provided with the name of the owner of the card in longitudinal spaced relation and on the same line. Card portion 12 is provided with the address of the owner on another line or immediately adjacent lines. Card portion 13 is provided with the account number 15 of the owner on still another line. There is thus provided on card portion 12 a set of information including name and address. On card portion 13 there is provided a different set of information including name and account number.

The card body member 11 may be provided with a score line 14 which divides the body member 11 into the two identical portions 12 and 13. The score line may be cut to a selected depth insufficient to prevent handling of the card means 10 as one single unit yet sufficient to permit the card portions 12 and 13 to be readily separated after the card has reached the owner so that the card portion 12 may be destroyed, discarded, or used for some other purpose by the owner such as a luggage tag.

In the method of producing and processing the card means described above it will be understood that a blank member of card stock material is provided which exceeds the length of the card ultimately to be used, and preferably has a length which is a multiple of the length of the final card. Such a multiple length blank member may be provided with data symbols, as by embossing, arranged to provide two or more sets of information as above described. A third set of information may include name and account number for a second member of the holder's family, the addressing information being the same as for the holder of the first card. When such a blank member has been so embossed, it may be manually or automatically machine inserted as one piece into an envelope 16 having a window 17 provided at a preselected portion thereof corresponding to the location of the address on card portion 12 so that the address will be visible.

Preferably the card means 10 and the envelope 16 are of approximately the same size and configuration so that the card means 10 will not slip or move in the envelope 16 during mailing. Such reduction in size of the envelope is also a cost savings factor.

When the card means 10 is thus mailed, it will be clear that the two portions 12 and 13 need not be compared, the card means 10 is handled as one single unit, the card means 10 permits automatic machine insertion into an envelope, and the steps in processing for mailing are virtually foolproof and error-free.

It will thus be readily apparent that the complex, tiresome and inaccurate step of collating a credit card having only the name and account number thereon with envelopes or mailing pieces bearing mailing addresses is eliminated. The composite card means bearing two sets of legible understandable information is readily embossed or provided with such information without difficulty while at the same time the two sets of information provided thereon facilitate handling of the card means for mailing purposes. It will be understood that the card means 10 may be of any suitable length and should have a length at least in excess of the length of the portion ultimately to be used to provide a mailing address card portion of sufficient length to receive the address data in the form desired.

The address bearing card portion may be destroyed after it is separated from the account bearing card portion. However, in some uses, the address portion 12 may be provided with an eyelet so that portion 12 may be used as a luggage tag. In such instance the faces of portion 12 may be printed with advertising matter which includes the name of the card issuing company and certain of its products. As a luggage tag or the like, card portion 12 provides constant continuous advertising for the card issuing company.

As an inventory control card, the invention contemplates that portion 12 would bear the mailing address as before. The account portion of the card would bear data such as department number, item, style, color, class, size, quantity, cost, and retail price. Such data may be embossed and printed with ink, may be in coded hole, or other data symbols capable of being read by data processing machines such as optical readers, character readers, etc. Such an inventory card may be placed in boxes of merchandise and when boxes are opened for use, the cards may be collected and inserted into an envelope and mailed to the manufacturer. After a selected period of time or after a selected number of cards are collected, the cards may be processed, the item, style, type, color, etc., of merchandise from each department determined and the inventory of merchandise brought to a preselected level. Such inventory cards may be used repeatedly. It will be apparent that only one example of inventory control use of the card is described and that many variations may be made.

Various changes and modifications may be made in the card means and method of using the same which come within the spirit of this invention and all such changes and modifications coming within the scope of the appended claim are embraced thereby.

I claim:

A composite identification and account card means having precollated readable identification information and coded data symbols thereon for error-free transmission to only one addressee, designation or the like comprising: an elongated card-like body member adapted to be handled as an integral unit during transmission and including at least two separable card body portions, one of said card body portions including understandable readable addressee identification information on one face thereof including name and address of addressee, the other of said card body portions, on the face corresponding to said one face, including the name of addressee and coded data symbols comprising account number information relating to addressee and not understandable with respect to addressee identification information, said other card body portion being cooperable with data processing devices for reading and transfer of information contained in said coded data symbols relating to the account of the addressee, said one card body portion being cooperable with a mailing system for error-free identification of and transmission to the said addressee of the other card body portion, said one card body portion when separated from the other card body portion serving as an understandable, readable identification card of the addressee, both card body portions including the name of addressee on a common line parallel to the longitudinal axis of said body member whereby error-free preparation of connected card body portions is provided, and whereby collation of information on said connected card body portions is not required for assuring said other card body portion is transmitted to the selected addressee.

References Cited in the file of this patent

UNITED STATES PATENTS

| | | |
|---|---|---|
| 1,502,137 | De Foreest et al. | July 22, 1924 |
| 1,985,114 | Storer | Dec. 18, 1934 |
| 2,357,444 | Armbruster | Sept. 5, 1944 |
| 2,616,612 | Guttman | Nov. 4, 1952 |
| 2,720,833 | Lindon | Oct. 18, 1955 |
| 2,903,276 | Bates | Sept. 8, 1959 |
| 2,941,711 | Biek | June 21, 1960 |
| 3,062,431 | Rabenold | Nov. 6, 1962 |